(12) United States Patent
Benjamin

(10) Patent No.: US 9,646,103 B2
(45) Date of Patent: May 9, 2017

(54) CLIENT-SIDE TEMPLATE ENGINE AND METHOD FOR CONSTRUCTING A NESTED DOM MODULE FOR A WEBSITE

(71) Applicant: MyMojo Corporation, Dallas, TX (US)

(72) Inventor: Michael Benjamin, Cedar Park, TX (US)

(73) Assignee: MyMojo Corporation, McKinney, TX (US)

( * ) Notice: Subject to any disclaimer, the term of this patent is extended or adjusted under 35 U.S.C. 154(b) by 281 days.

(21) Appl. No.: 14/490,820

(22) Filed: Sep. 19, 2014

(65) Prior Publication Data

US 2016/0012145 A1   Jan. 14, 2016

Related U.S. Application Data

(63) Continuation-in-part of application No. 14/478,132, filed on Sep. 5, 2014, which is a continuation-in-part of application No. 14/458,347, filed on Aug. 13, 2014, which is a continuation-in-part of application No. 14/328,630, filed on Jul. 10, 2014.

(51) Int. Cl.
*G06F 17/00* (2006.01)
*G06F 17/30* (2006.01)
*G06F 17/22* (2006.01)
*G06F 17/24* (2006.01)

(52) U.S. Cl.
CPC .... *G06F 17/30896* (2013.01); *G06F 17/2229* (2013.01); *G06F 17/2247* (2013.01); *G06F 17/248* (2013.01)

(58) Field of Classification Search
CPC .......................................... G06F 17/20–17/289
See application file for complete search history.

(56) References Cited

U.S. PATENT DOCUMENTS

| 7,047,318 | B1 | 5/2006 | Svedloff |
| 7,131,066 | B1 | 10/2006 | Birsan et al. |
| 8,260,844 | B2 | 9/2012 | Timmons |
| 8,397,212 | B2 | 3/2013 | Chijiiwa |

(Continued)

OTHER PUBLICATIONS

Dino Esposito, Cutting Edge: AJAX Application Architecture, Part 1, MSDN Magazine, Sep. 2007.

*Primary Examiner* — Keith Bloomquist
(74) *Attorney, Agent, or Firm* — Steven W. Smith

(57) ABSTRACT

A method in a client web browser for constructing a nested Document Object Model (DOM) module for a website. The module includes a module template, which includes tags to be replaced with data, and a module Driver, which includes functional code for creating a nested data structure. A client-side templating engine retrieves data from a data source that includes data for populating the tags and data for creating a plurality of data blocks for the nested data structure. The templating engine populates the tags in the module template with the data for the tags, and the module Driver sequentially creates the data blocks using the data for creating the data blocks. Upon completion of each data block, the module Driver appends the completed data block to the module template to create the nested data structure. The completed module includes the template with populated tags and the nested data structure.

9 Claims, 16 Drawing Sheets

(56) References Cited

U.S. PATENT DOCUMENTS

| | | | |
|---|---|---|---|
| 8,930,443 B1* | 1/2015 | Warner | H04L 67/141 |
| | | | 709/203 |
| 2006/0047780 A1 | 3/2006 | Patnude | |
| 2006/0075088 A1 | 4/2006 | Guo et al. | |
| 2006/0150082 A1 | 7/2006 | Raiyani et al. | |
| 2006/0200535 A1* | 9/2006 | Moser | G06F 9/4445 |
| | | | 709/217 |
| 2006/0248166 A1 | 11/2006 | Milosevic et al. | |
| 2006/0265488 A1 | 11/2006 | Tuttle et al. | |
| 2006/0288328 A1 | 12/2006 | Cross, Jr. et al. | |
| 2011/0161458 A1 | 6/2011 | Rumelhart | |
| 2011/0191417 A1 | 8/2011 | Rathod | |
| 2011/0289419 A1 | 11/2011 | Yu et al. | |
| 2012/0110437 A1 | 5/2012 | Pan et al. | |
| 2012/0131439 A1 | 5/2012 | Hill et al. | |
| 2012/0159295 A1* | 6/2012 | Rabstejnek | G06F 17/30896 |
| | | | 715/205 |
| 2012/0290920 A1* | 11/2012 | Crossley | G06F 8/38 |
| | | | 715/234 |
| 2012/0324422 A1* | 12/2012 | Chartier | G06F 8/75 |
| | | | 717/109 |
| 2013/0111595 A1* | 5/2013 | Amit | G06F 21/52 |
| | | | 726/25 |
| 2013/0185643 A1 | 7/2013 | Greifeneder et al. | |
| 2013/0311875 A1 | 11/2013 | Pappas et al. | |
| 2013/0332284 A1 | 12/2013 | Faith et al. | |
| 2013/0339109 A1 | 12/2013 | Steelberg | |
| 2014/0089782 A1 | 3/2014 | Cook | |
| 2014/0281876 A1* | 9/2014 | Schmidt | G06F 17/241 |
| | | | 715/230 |
| 2015/0058291 A1* | 2/2015 | Earl | G06F 17/30144 |
| | | | 707/625 |
| 2015/0058298 A1* | 2/2015 | Earl | G06F 11/1425 |
| | | | 707/674 |
| 2015/0058577 A1* | 2/2015 | Earl | G06F 3/0613 |
| | | | 711/136 |

* cited by examiner

```
<!DOCTYPE html>
<html>
    <head>
        <title>Title Here</title>
        <meta charset="UTF-8">
        <meta name="viewport" content="width=device-width, initial-scale=1.0">
        <link href="style.css" rel="stylesheet">
    </head>
    <body>
        <div>
            ... HTML content here ...
        </div>
        <script src="functions.js" type="text/javascript"></script>
    </body>
</html>
```

FIG. 1
(Prior Art)

```
<!-- BEGIN: person -->
<div>{{Name}}</div>
<div>{{Address}}</div>
<!-- END: person -->
```

FIG. 3A
(Prior Art)

```
<?php
$t = new TemplateEngine();
$t->Name = $data_source['name'];
$t->Address = $data_source['address'];
$t->render('person');
?>
```

FIG. 3B
(Prior Art)

```
<div class="container"></div>
<div class="template">
        <div>{{NAME}}</div>
</div>
<script>
        var names = ["Bill", "Bob", "Joe"];
        // or var names = get_names_from_server();
        var t = new TemplateEngine();
        for(x=0;x<names.length;x++){
                t.assign("Name", names[x]);
                document.getElementById("container").appendChild( t.render() );
        }
</script>
```

FIG. 4
(Prior Art)

```
<!DOCTYPE html>
<html>
    <head>
        <title>Title Here</title>
        <meta charset="UTF-8">
        <meta name="viewport" content="width=device-width, initial-scale=1.0">
    </head>
    <body>
        <div id="content_div"></div>

<script src="jquery.js"></script>
        <script src="handlebars.js"></script>
        <script id="entry-template" type="text/x-handlebars-template">
        <div class="entry">
            <h1>{{title}}</h1>
            <div class="body">
                {{body}}
            </div>
        </div>
        </script>
        <script>
            var source  = $("#entry_template").html();
            var template= Handlebars.compile(source1);
            var context = {"title": "My New Post", "body":"This is my first post!"};
            var html = template(context);
            $('#content_div').html(html);
        </script>
    </body>
</html>
```

FIG. 5
(Prior Art)

```html
<!DOCTYPE html>
<html>
    <head>
        <script src="jquery.js"></script>
        <script src="handlebars.js"></script>
    </head>
    <body>
        <div id="content_div"></div>
        <script id="entry-template" type="text/x-handlebars-template">
            <div class="entry">
                <h1>{{title}}</h1>
                <div class="body">
                    {{body}}
                </div>
            </div>
        </script>
        <script id="ad-template" type="text/x-handlebars-template">
            <div class="ad">{{ad_text}}</div>
        </script>
        <script type="text/javascript">
        $(function() {
            var source1 = $("#entry_template").html();
            var template1= Handlebars.compile(source1);

var data1 = {"title": "Some Title", "body":"Some Body"};
            var html1 = template1(data1);
            $('#content_div').append(html);
            $('#content_div').find('.body').last().on('click',function(){
                alert('The title for this entry is ' + data1['title'] + '!');
            });

var data2 = {"title": "Some Other Title", "body":"Some Other Body"};
            var html2 = template1(data2);
            $('#content_div').append(html);
            $('#content_div').find('.body').last().on('click',function(){
                alert('The title for this entry is ' + data2['title'] + '!');
            });

var source2 = $("#ad_template").html();
            var template2= Handlebars.compile(source2);
            var data3 = {"ad_text": "Click here for the secret ingredient "};
            var data3_supplemental = 'cheese';
            var html3 = template2(data3);
            $('#content_div').append(html);
            $('#content_div').find('.ad').last().on('click',function(){
                alert('The secret is ' + data3_supplemental + '!');
            });

});
        </script>
    </body>
</html>
```

FIG. 6 (Prior Art)

```
<div id="content_block_1">Content Here</div>
<script>
    console.log(getDocumentById('content_block_1').innerHTML());
</script>
<div id="content_block_2">And More Content Here</div>
<script>
    console.log(getDocumentById('content_block_2').innerHTML());
</script>
```

FIG. 7A
(Prior Art)

```
<!-- First module -->
<div class="container"></div>
<script> $('.container').html("Contents"); </script>
<!--Second Module -->
<div class="container"></div>
<script> $('.container').html("Contents2"); </script>
<!--Third Module -->
<div class="container"></div>
<script> $('.container').html("Contents3"); </script>
```

FIG. 7B
(Prior Art)

```
<!-- First module -->
<div class="container"></div>
<script>
        var s = document.currentScript
        var d = $(s).prev();
        d.html("Contents");
</script>
<!--Second Module -->
<div class="container"></div>
<script>
        var s = document.currentScript
        var d = $(s).prev();
        d.html("Contents2");
</script>
<!--Third Module -->
<div class="container"></div>
<script>
        var s = document.currentScript
        var d = $(s).prev();
        d.html("Contents3");
</script>
```

FIG. 8
(Prior Art)

```
<style>
    /* CSS rules here*/
</style>
<div>
    <!-- HTML here -->
</div>
<script class="[[Katy_id]]_driver">
(function () {
    var driver= $('.[[Katy_id]]_driver').first();
    var display = driver.prev(); driver.remove();

//... additional JavaScript here
})();
</script>
```

FIG. 9

```
<!DOCTYPE html>
<html>
  <head>
        <script src="jquery.js"></script>
        <script src="katy.js"></script>
  </head>
  <body>
        <div id="content_div"></div>
        <script>
        $(function() {
            $.when($.katy_init()).then(function(){ var data1 = {'title':'Some Title', 'body':'Some Body'};
                $('#content_div').append( $.katy_create( 'post', data1) );

var data2 = {'title':'Some Other Title', 'body':'Some Other Body'};
                $('#content_div').append( $.katy_create( 'post', data2) );

var data3 = {"ad_text": "Click here for the secret ingredient", "Secret":"Cheese"};
                $('#content_div').append( $.katy_create( 'ad', data3) );
            });
        });
        </script>
  </body>
</html>
```

FIG. 10

```
<div class="entry">
   <h1>[[title]]</h1>
   <div class="body">
      [[body]]
   </div>
</div><script class="[[Katy_id]]_driver">
(function () {
    var driver= $('.[[Katy_id]]_driver');
    var display = driver.prev(); driver.remove();

display.on('click','.body',function(){
        alert('The title for this entry is [[title]]');
    });
})();
</script>
```

FIG. 11

```
<div class="ad">[[ad_text]]</div>
<script class="[[Katy_id]]_driver">
(function () {
    var driver= $('.[[Katy_id]]_driver').first();
    var display = driver.prev(); driver.remove();

display.on('click',function(){
            alert('The secret is [[Secret]]!');
    });
})();
</script>
```

FIG. 12

```
<!DOCTYPE html>
<html>
    <head>
        <script src="jquery.js"></script>
        <script src="katy.js"></script>
    </head>
    <body>
        <div id="content_div"></div>
        <script>
        $(function() {
            $.when($.katy_init()).then(function(){
                var data = {
                    'Title':'Some album',
                    'Photos':[
                        {'File':'1.jpg'},
                        {'File':'2.jpg'},
                        {'File':'3.jpg'},
                        {'File':'4.jpg'}
                    ]
                };
                $('#content_div').append( $.katy_create( 'album', data) );
            });
        });
        </script>
    </body>
</html>
```

FIG. 13

```
<div>
    <h1>[[Title]]</h1>
</div><script class="[[Katy_id]]_driver">
(function () {
    var driver= $('.[[Katy_id]]_driver').first();
    var display = driver.prev(); driver.remove();
    var data = $.katy_data_get([[Katy_id]]);

for(var i=0; i<data['Photos'].length; ++i)
        display.append( $.katy_create('photo', data['Photos'][i]) );
}) ( );
</script>
```

FIG. 14

```
<div class="photo">
        [[File]]: <img src"[[File]]"/>
</div>
```

FIG. 15 person = {name:"Bill", address:"100 N Main", city:"Dallas", state:"TX"}

FIG. 16A
(PRIOR ART)

people = [
    {name:"Bill", address:"100 N Main", city:"Dallas", state:"TX"},
    {name:"Bob", address:"200 N Main", city:"Dallas", state:"TX"},
    {name:"Joe", address:"200 N Main", city:"Dallas", state:"TX"}
];

FIG. 16B

```
people = [
    {name:"Bill",
      street_address:{
            number:"100",
            direction:"N",
             street:"Main",
             type:"Street"},
      city:{
            city_name:"Dallas",
            state:"Texas",
            postal:"75244"
     }},
    {name:"Bob",
      street_address:{
            number:"200",
            direction:"N",
             street:"Main",
             type:"Street"},
      city:{
            city_name:"Dallas",
            state:"Texas",
            postal:"75244"
     }},
    {name:"Joe",
      street_address:{
            number:"300",
            direction:"N",
             street:"Main",
             type:"Street"},
      city:{
            city_name:"Dallas",
            state:"Texas",
            postal:"75244"
     }},
];
```

FIG. 16C

```
<!-- First module -->
<div class="container"></div>
<script class="driver">
    var driver= $('.driver').first();
    var display = driver.prev(); driver.remove();
    display.html("Contents");
</script>
<!-- Second module -->
<div class="container"></div>
<script class="driver">
    var driver= $('.driver').first();
    var display = driver.prev(); driver.remove();
    display.html("Contents2");
</script>
<!-- Third module -->
<div class="container"></div>
<script class="driver">
    var driver= $('.driver').first();
    var display = driver.prev(); driver.remove();
    display.html("Contents3");
</script>
```

FIG. 18

CLIENT-SIDE TEMPLATE ENGINE AND METHOD FOR CONSTRUCTING A NESTED DOM MODULE FOR A WEBSITE

CROSS-REFERENCE TO RELATED APPLICATIONS

This application is a Continuation-in-Part of U.S. patent application Ser. No. 14/478,132 filed Sep. 5, 2014, which is a Continuation-in-Part of U.S. patent application Ser. No. 14/458,347 filed Aug. 13, 2014, which is a Continuation-in-Part of U.S. patent application Ser. No. 14/328,630 filed Jul. 10, 2014, the disclosures of which are fully incorporated herein by reference.

TECHNICAL FIELD

The present disclosure relates to a client-side templating engine and method for constructing a nested Document Object Model (DOM) module for a website.

BACKGROUND

A website document, which is designed to be viewed in a web browser, comprises HyperText Markup Language (HTML) markup and various assets, which are parsed by the web browser and laid out to form a visible web page. The assets include images, Cascading Style Sheet (CSS) documents, JavaScript documents, as well as any embedded media. The common practice, and industry standard, is to load the HTML of the page, and then parse other assets to alter the layout of that HTML, place images as needed, and set "listeners" (triggers) on various Document Object Model (DOM) elements in order to react to user input. The DOM is an Application Programming Interface (API) for valid HTML and well-formed XML documents. It defines the logical structure of documents and the way a document or data is accessed and manipulated. This procedure typically causes the website to be parsed as a monolithic document with JavaScript and CSS resources loaded either in the header of the DOM and/or near the bottom, so that scripts can attach listeners to, or otherwise alter, referenced DOM elements.

FIG. 1 illustrates a typical coding structure for a conventional simple website. The typical method of programming a website includes HTML mark up to set up the structure of the site. On line 7 of the code in FIG. 1, a CSS document is referenced, which causes the web browser to request the CSS document from the server. Only after the browser loads the CSS document does the browser continue to parse the rest of the HTML mark up. On line 13 of the code in FIG. 1, a JavaScript document is referenced. This reference causes the web browser to request the JavaScript document from the web server, and the code contained in the JavaScript document is compiled and run by a JavaScript engine in the browser. At that point, if the JavaScript code calls for a listener to be attached to a particular DOM element in the HTML mark up, a reference for the particular DOM element is made by the element's ID attribute, or by the element's class attribute. This requires a poll of every DOM element in the page to take place in order to find any and all elements that match the reference set by the JavaScript code. If the page is short, this polling is minimal. However, if the page is very long, and several elements are referenced by the JavaScript code, this polling becomes very expensive in terms of performance. Additionally, if care is not taken to ensure that elements have unique ID's and classes, a greedy reference by the JavaScript will cause the wrong elements to be affected, and the website functionality will become unstable and unreliable.

In the case of a conventional "static" website, when the user clicks on a link, for example a link from a home page to a sub-page of the website, the browser destroys the DOM instance for the home page and unloads it from memory. The browser then sends an HTTP request to the server requesting information from the server for the sub-page. The browser then creates a new DOM instance for the sub-page. Thereafter, this process of downloading resources, creating a new DOM instance, and then destroying the DOM instance and starting over is repeated for each new page requested by the user.

FIG. 2 is a message flow diagram illustrating the flow of messages between a user 10, a client browser 11, and a website server 12 in a method of operating a conventional static website. At step 13, the user types in a web address directing the browser to go to the website, somesite.com/home. At step 14, the browser requests information from the server for the home page of somesite.com by sending an HTTP request to the server. At step 15, the server processes the request and returns to the browser, a string containing resources such as full HTML, CSS documents, JavaScript code, and all content data associated with the home page. At step 16, the browser interprets the HTML code and creates a new DOM instance. In optional steps 17 and 18, the browser may request and receive from the server, cacheable resources that have not yet been downloaded.

At step 19, the browser interprets and executes the JavaScript code, and displays the somesite.com home page to the user. At step 20, the user browses the home page, and at step 21, attempts to view content that was not included in the original content data received from the server. For example, the user may click on a link to a sub-page of the somesite.com website. In response, the browser destroys the DOM instance for the home page and unloads it from memory at step 22. At step 23, the browser then sends an HTTP request to the server requesting information from the server for the sub-page of somesite.com. The process then repeats, with the browser creating a new DOM instance for the sub-page. Thereafter, this process of downloading resources, creating a new DOM instance, and then destroying the DOM instance and starting over is repeated for each new page requested by the user.

In order to break the monolithic nature of a website and cause the content to be delivered in a modular fashion, a templating system is often used. In such a system, reusable HTML markup code is used as a template, and a data source is used to populate various portions of the template, before being rendered as needed within the webpage. There are basically two types of templating systems—those that run on the server side, and those that run on the client side. In both instances, a data source is used to populate various fields within an HTML template, and the resulting HTML code is returned to the web browser for display.

FIG. 3A illustrates a typical coding structure for producing a simple server-side template. Server-side templates take data from a data source, populate the template, and then piece together the rendered results to create a single web page, before sending it to the browser for display. Server-side templates employ a templating engine in the server-side code to populate templates that are coded in HTML and either a proprietary templating language or the corresponding server-side code.

FIG. 3B illustrates a typical coding structure for replacing the tags in the server-side template of FIG. 3A with data.

Server-side code such as PHP: Hypertext Preprocessor (PHP) takes data from a data source and makes a call to the templating engine to replace the tags in the template with the data. Thus, in the above example, a typical templating engine is invoked, provided with variables from a data source, and then rendered to return the HTML to the client browser.

Server-side templating engines separate presentation development from data modeling and business logic development, and provide a code base that is easier to maintain and change as needed. Server-side templating engines also allow for HTML template code to be reused, which reduces the amount of code that has to be written, which in turn reduces the chances for bugs or breaking functionality when changes are made. However, server-side templating engines return full HTML documents to the client, and much of the HTML being transferred in the response from the server is likely to be duplicated blocks of code with different values in the fields. For example, the following HTML is repeated three times with different values:

```
<div>Bill</div>
<div>Bob</div>
<div>Joe</div>
```

The HTML for each element is a simple <div></div> tag group, and it is repeated with different first names inserted. However, because the HTML was rendered in the server-side code, the entire string of HTML code is sent to the client. In this small example, the amount of code is negligible. However, on large websites with extremely large numbers of repeating objects, this is very inefficient and requires much more bandwidth than should be necessary.

Client-side templates send a copy of the template to the client's browser, along with structured data to serve as a data source, and the template is populated with JavaScript in the browser. This method greatly reduces bandwidth usage between the client and server on sites that have a large amount of content with duplicated formatting.

Client-side templates are typically managed by templating engines that are written in JavaScript. Therefore, they run within the JavaScript virtual machine built into the web browser. In this scenario, only one copy of the template is sent in the response from the web server, along with a string of structured data to be used for populating the template. The templating engine in the web browser is then called in JavaScript code within the document to parse the data source, replace the tags appropriately within the template, and then render the template as many times as needed within the browser.

FIG. 4 illustrates a typical coding structure for producing a client-side template using the same example as shown above, but implemented in client-side templating. While this example comprises more lines of code than the server-side example, it does not grow in size as the number of elements in the data source grows. In other words, if the "names" variable contained 100 names, the only change would be that one line would be longer, and no other lines of code are needed. Additionally, if the data source was referencing a function (as shown in the commented code line), the amount of data items could be extremely large without additional code being written.

Most importantly, however, is the fact that this is the total amount of code that would be required to be sent in the web server response, and the data string could be sent in separate calls to the server as needed.

Thus, using client-side templates provides a large decrease in bandwidth required for a large website containing several blocks of repeated markup sections. Additionally, since the HTML template is already loaded into the browser, additional calls to the server for more data can be made asynchronously to populate a site with fresh content, or additional content, in response to time passing or user interaction of the page.

Client-side templating engines are typically written in JavaScript and are available with open source as well as commercial licensing. While they produce the advantages stated above, none are as robust as their server-side counterparts with regard to nesting, embedded logic, and the capability to pass complex data structures.

FIG. 5 illustrates a simplified example of the use of client-side templates in a conventional website. This example uses Handlebars.js, which is a popular templating engine. Those skilled in the art will readily recognize this coding structure. Although such a templating system assists with modularity, as well as separating presentation design from the data source, on a very large site with a large number of modular sections, collisions in class definitions and the increased polling required to attach listeners to specific DOM elements negatively impact scaling, performance, and reliability.

FIG. 6 illustrates a typical coding structure for the use of a common client-side templating engine, which allows a reusable template to be populated from a data source. In this example, an HTML template containing replaceable tags for "title" and "body" is included in a script block. The templating engine then compiles the template. Then, a data source is defined, which may be static data or a web service that returns the data in a usable format. The example includes hard-coded static data for demonstration purposes only. Those tags in the compiled template are replaced by data contained in the data source object, based on the names for each of the object elements. For example, {{title}} in the template may be replaced by "My New Post", when that is the value of the "title" element in the data source object. HTML is rendered from the compiled template with replaced values and then the "div" element with the ID attribute of "content_div" is populated with the resulting HTML.

This method of programming allows for reuse of presentation mark up code (HTML), and separates the data from the presentation for maintainability and readability of the code. However, when scaled to larger sites, performance degrades quickly because the compilation of templates and the bloat in the third-party templating engine library is expensive in terms of processing resources. Additionally, the excess polling problem mentioned previously is not addressed. Once the template is compiled, values are replaced, and HTML is generated, the JavaScript must search the DOM for the correct element to populate with the results. Again, this causes increasingly poor performance as the size of the site grows and the number of DOM elements increases. The possibility of class collisions also still exists.

When building an interactive web application, client-side code written in JavaScript is typically used to attach event listeners onto DOM elements, run specific callback functions when those events are triggered, and manipulate the DOM elements as necessary to provide feedback for user interaction. In all but the smallest and simplest applications, it is often necessary to include more than one script tag in the DOM, which includes the JavaScript code to manage the application. This is especially the case when creating modular applications in which each module contains a script block to control the module to which the script block is attached.

FIG. 7A illustrates a typical coding structure for managing DOM elements defined just prior to a script block. The code contains two sections of code, which includes HTML markup and two JavaScript blocks. In this example, the code in the two script blocks will run sequentially as the browser loads them into the DOM. This method of development is typical and does not pose problems in simple web applications with very little user interaction required. However, as web applications have become more complex, a need to reference which script block's code is currently running has developed. One example of this is when scripts are being loaded dynamically in repeated modules on a single page, and each script block is required to act on DOM elements only within the module to which the script block is attached.

FIG. 7B illustrates a typical coding structure for loading scripts dynamically in repeated modules on a single page. In this example, the first module will load into the DOM and the code in the module's script block will run, inserting the word "Contents" into the first <div> element with the class name of "container", as expected. However, when the page continues loading, the second module will load into the DOM and the code in the second script tag will run. It will insert the word "Contents2" into all elements in the DOM that have the class of "container." This will not only insert the content into the div tag contained as part of the second module, it will also replace the contents in the div tag which is part of the first module, because it also has the class name of "container." Additionally, running the third module's code will result in the content of all three div elements being "Content3."

The problem shown in this example can be avoided by having a unique ID for each div tag and writing the JavaScript to reference the tag by the ID attribute. However, this limits code reuse and many other advantages gained by using a modular, template-driven website composition.

FIG. 8 illustrates a coding structure for an alternative way to load scripts dynamically in repeated modules on a single page. In this example, the problem is solved by making the scripts aware of themselves, and referencing only the DOM elements relative to each script. However, although this method solves the problem when loading modules sequentially, it does not work when modules are loaded dynamically or asynchronously. Also, the currentScript property is likely to return a reference to the incorrect DOM element should another script be running asynchronously elsewhere in the page. The currentScript property is also not supported in many older browsers.

SUMMARY

The typical method of developing a website does not lend itself to modularity, and performance is greatly reduced as the site scales in size and traffic. The trend is for websites to use a variety of disparate data sources to build content in a modular fashion, and then to compile the modules together to form a webpage. As the number of different types of modules increases, or even the number of modules of a single type increases, class collisions and excess DOM polling create instability and performance degradation in the browser, as well as an increased load on the server. Additionally, because the modules are loaded synchronously as the page is rendered, the poor performance of a single module negatively affects all other modules below it in the DOM structure.

It would be advantageous to have a method of assembling the contents of a website that overcomes the deficiencies of traditional website design methodologies. The disclosed solution provides the bandwidth savings and performance enhancements of the typical client-side solution, with the robust feature set that server-side engines typically employ. This is achieved, in part, by encapsulating each module, and programming the software to sandbox the CSS and JavaScript for each module to avoid collisions, while at the same time, allowing modules to interact on a specified level as needed during user interaction.

The present disclosure provides a method of software development that creates a modular website, in which each module contains an HTML template, as well as a JavaScript block referred to as a "Driver", which, when initialized, provides the data source and any DOM manipulation instructions necessary to make the template elements behave as desired. The combination of these elements creates a website that is modular and capable of using disparate data sources while eliminating the performance degradation and class collisions associated with other methods.

The method includes the development of a client-side templating engine, which uses simple string replacement to populate elements from a data source. The templating engine does not require compilation, and does not contain code for logical operators or other unnecessary functionality found in other commercial and open source offerings. The engine performs all of the functionality required to return HTML from a call to a single function. Calling this function from JavaScript code, and sending the correct information in the call, allows the templating engine to retrieve the proper template as well as retrieve and parse the data source. The templating engine retrieves all required information from a server-side controller when called correctly, thus eliminating the need to specify a data source for the module. Additionally, the module templates may be compressed and cached in the client's browser as JavaScript Object Notation (JSON) files so that repeated calls for the same template does not require a request being sent to the web server. This greatly improves bandwidth utilization, performance, and scalability of the web application.

The method also utilizes class namespacing in the CSS portions of each module. This eliminates class collisions and speeds up DOM polling when attaching listeners to DOM elements, or when manipulating DOM elements.

Each module includes a "Driver", written in JavaScript. The Driver receives instructions from the calling script and performs a number of functions. The Driver retrieves data from a defined data source for the module, populates and renders the template portion of the module, attaches listeners to the DOM elements of the template, and manipulates the DOM elements of the template as needed in order to allow user interaction with the module.

The Driver code for each module may be initialized and run asynchronously, rather than having one module waiting for another. This functionality improves the user experience and ensures the performance of each module does not affect the performance of other modules. The client web browser dynamically loads in any order, a plurality of modules comprising Hypertext Markup Language (HTML) markup for a webpage when one or more HTML scripts are running asynchronously elsewhere on the webpage. The web browser is implemented in a computer having a processor and a memory, and the web browser is in communication with a website server via a network connecting the computer and the web server. The web browser receives from the web server, information for creating a DOM from the plurality of modules. The processor performs the following steps for each module: separating the module into two functional parts: (1) a module template comprising HTML markup that includes tags to be replaced with data; and (2) a module Driver comprising an identifier tag and functional code controlling the operation of the module Driver. The functional code controlling the operation of the module Driver causes the module Driver to populate the identifier tag with an internal identifier for the module, thereby creating a unique ID attribute for the Driver, which enables the Driver to operate independent of other drivers that control other modules.

When the module Driver includes a driver variable, the client web browser may also set the driver variable to reference the module Driver, thereby loading the functional code into memory and removing the module Driver from the DOM.

When the module Driver includes a display variable, the client web browser may also set the display variable to reference in the module template, a DOM element that can be found relative to the module Driver, thereby sandboxing all actions by the module Driver into the referenced DOM element in the template. This DOM element is preferably the DOM element immediately prior to the module Driver. Referencing the DOM element in the template prevents collisions with the scripts running asynchronously elsewhere on the webpage, and eliminates polling for matching DOM elements.

One embodiment of the present disclosure is directed toward a method of loading separate DOM modules utilizing self-referencing of running script elements. Each DOM module is separated into a module template and a module Driver following the template, wherein the module template comprises HTML markup that includes tags to be replaced with data, and the module Driver comprises an identifier (ID) tag, a driver variable, a display variable, and functional code controlling the operation of the module Driver. The web browser is implemented in a computer having a processor and a memory, and the method comprises the processor performing the following steps for each DOM module:

executing the functional code controlling the operation of the module Driver to ensure the ID tag is set as a unique identifier for the module, thereby creating a unique ID attribute for the Driver, which enables the Driver to operate independent of other drivers that control other modules;

executing the functional code controlling the operation of the module Driver to set the driver variable to reference the module Driver, thereby loading the functional code into memory and removing the module Driver from the DOM; and executing the functional code controlling the operation of the module Driver to set the display variable to reference in the module template, a DOM element that can be found relative to the module Driver, thereby sandboxing all actions by the module Driver into the referenced DOM element in the template, preventing collisions with the modules running asynchronously elsewhere on the webpage, and eliminating polling for matching DOM elements.

The method allows the loading of modules either sequentially or dynamically in any order, even when another script is running asynchronously elsewhere on the page. The method also allows nested modules to be loaded to create parent-child relationships between modules, while maintaining the correct context for the running code within each individual module.

Another embodiment is directed toward a computer-implemented method of constructing "nested" modules. In this embodiment, a first module may call for a second module, which when parsed, becomes one or more smaller, repeatable parts of the first module. This allows for modules themselves to be modular, and allows for better maintainability, faster development, and more efficient processing of the Drivers controlling the modules.

One particular embodiment is directed toward a computer-implemented method and web browser for utilizing the client-side templating engine to construct a nested website DOM module. A processor within a computer executes code stored in a non-transitory memory to perform the method, which includes receiving by the client-side templating engine, a single call to create the nested DOM module. The client-side templating engine then retrieves data from a data source, the data from the data source including data for populating the tags in the module template and data for creating a plurality of data blocks to be included in a nested data structure. The client-side templating engine populates the tags in the module template with the data for the tags, and the module Driver sequentially creates the plurality of data blocks using the data for creating the data blocks. Upon completion of each data block, the module Driver appends the completed data block to the module template to create the nested data structure. In response to the single call to create the nested DOM module, the client-side templating engine then returns the nested DOM module including the template with populated tags and the nested data structure.

Another embodiment is directed toward the DOM module Driver in a client-side templating engine executed by a processor controlling a client-side web browser. The DOM module Driver is configured to create a nested data structure for a DOM module that includes the DOM module Driver and a module template. When the web browser makes a single call to the client-side templating engine to create the DOM module, the DOM module Driver sequentially creates a plurality of data blocks using data objects obtained from a data source. Upon completion of each data block, the DOM module Driver appends the completed data block to the module template to construct the nested data structure. In response to the single call to create the nested DOM module, the client-side templating engine returns to the web browser, the DOM module including the nested data structure.

The number of data blocks appended by the DOM module Driver is not limited by the client-side templating engine. Additionally, it should be noted that additional levels of complexity can be achieved when at least one of the data blocks appended by the DOM module Driver includes multiple smaller data blocks.

Further features and benefits of embodiments of the disclosure will become apparent from the detailed description below.

BRIEF DESCRIPTION OF THE DRAWINGS

In the following section, the invention will be described with reference to exemplary embodiments illustrated in the figures, in which:

FIG. 1 (Prior Art) illustrates a typical conventional coding structure for a simple website;

FIG. 3A (Prior Art) illustrates a typical coding structure for producing a simple server-side template;

FIG. 3B (Prior Art) illustrates a typical coding structure for replacing the tags in the server-side template of FIG. 3A with data;

FIG. 4 (Prior Art) illustrates a typical coding structure for producing a client-side template;

FIG. 5 (Prior Art) illustrates a typical conventional coding structure for the use of client-side templates in a conventional website;

FIG. 6 (Prior Art) illustrates a typical conventional coding structure for the use of a client-side templating engine;

FIG. 7A (Prior Art) illustrates a typical coding structure for managing DOM elements defined just prior to a script block;

FIG. 7B (Prior Art) illustrates a typical coding structure for loading scripts dynamically in repeated modules on a single page;

FIG. 8 (Prior Art) illustrates a coding structure for an alternative way to load scripts dynamically in repeated modules on a single page;

FIG. 9 illustrates the skeleton code for beginning to program a module in accordance with the present disclosure;

FIG. 10 illustrates the coding structure for use of a template driver system to create a modular section of a larger HTML document;

FIG. 11 illustrates the coding structure for the "post" module called in lines 14 and 17 of the code in FIG. 10;

FIG. 12 illustrates the coding structure for the "ad" module called in line 20 of the code in FIG. 10;

FIG. 13 illustrates the coding structure for an example of nested modules;

FIG. 14 illustrates the coding structure for the example "album" module of FIG. 13;

FIG. 15 illustrates the coding structure for a procedure for calling the code to create a "photo" module;

FIG. 16A (Prior Art) illustrates objects representing a conventional simple data structure in a single level;

FIG. 16B illustrates objects representing a slightly more complex data structure having two levels;

FIG. 16C illustrates objects representing a complex data structure supported by the Driver system of the present disclosure;

FIG. 18 is a simplified block diagram of the client-side web browser of the present disclosure;

DETAILED DESCRIPTION

Figure 2:
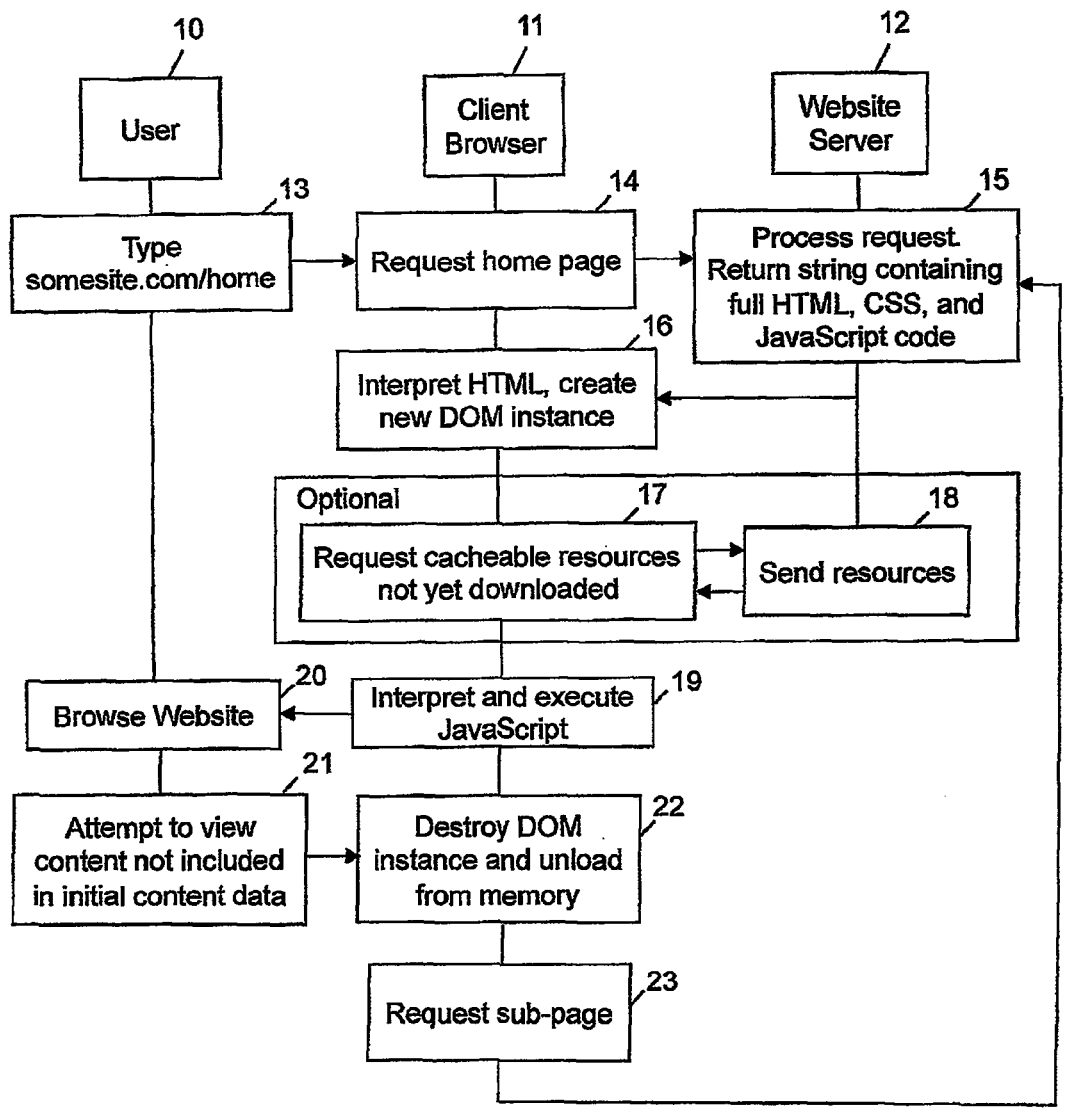
FIG. 2 (Prior Art) is a message flow diagram illustrating the flow of messages between a user, a client browser, and a website server in a method of operating a conventional static website.

The present disclosure will now be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor. Various "servers" and "systems" disclosed herein are understood by those skilled in the art to include processors, non-transitory memories, and software comprising computer program instructions to be executed by the processors thereby causing the servers and systems to perform the stated functions.

FIG. 9 illustrates the skeleton code for beginning to program a module in one exemplary embodiment of the present disclosure. This embodiment illustrates that the module includes a module Driver written in JavaScript. The Driver code for each module may be initialized and run asynchronously, rather than having one module waiting for another. This functionality improves the user experience and ensures the performance of each module does not affect the performance of other modules. The module Driver may include an identifier tag, functional code controlling the operation of the module Driver, a driver variable, and a display variable. The functional code may populate the identifier tag with an internal identifier for the module, thereby creating a unique ID attribute for the Driver, which enables the Driver to operate independent of other drivers that control other modules. The functional code may also set the driver variable to reference the module Driver, thereby loading the functional code into memory and removing the Driver from the DOM. This function further reduces the size of the DOM and thereby further reduces polling and querying requirements of other client-side code. The functional code may also set the display variable to reference in the module template, a DOM element immediately prior to the module Driver, thereby sandboxing all actions by the module Driver into the referenced DOM element in the template, preventing collisions with the scripts running asynchronously elsewhere on the webpage, and eliminating polling for matching DOM elements.

Once initialized, the Driver receives instructions from the calling script and may retrieve data from a defined data source for the module, populate and render the template portion of the module, attach listeners (triggers) to the DOM elements of the template, and manipulate the DOM elements of the template as needed in order to enable user interaction with the module.

FIG. 10 illustrates the coding structure for use of a template driver system to create a modular section of a larger HTML document. This process produces templates similar to the method of FIG. 6, but utilizes a modular architecture and employs a JavaScript Driver for each module. In this example, the <div> tag with the ID of "content_div" becomes a container for the content that will be generated. With the templating engine given the nickname "Katy Library", functions beginning with "katy_" are calling methods within that templating engine library. The first function in line 11 of the code, katy_init( ), reports back when the engine is ready to begin processing templates and data. Then, within that conditional block, three modules are called using the katy_create( ) function. The katy_create( ) function takes two arguments: the type of module to create (such as "post" or "ad") and the data to pass to the module (such as "data1", "data2", or "data3"). This information is hard coded in the example, but it may also be from a remote data source, which returns the required data in a JSON format.

FIG. 11 illustrates the coding structure for the "post" module called in lines 14 and 17 of the code in FIG. 10. The top five lines of the module provide the HTML template portion, which contains tags to be replaced with data. In this example, there are two tags—[[title]] and [[body]]. The templating engine utilizes string replacement to replace these tags with the values passed to it in the data source variable—the second argument passed to the katy_create( ) function as noted above. Below the HTML markup code, or template, is a JavaScript block containing the Driver for this individual module. It also has a tag, [[Katy_id]], in line 6 of the code, which is populated with the internal ID of the module, thereby creating a unique ID attribute for this block of JavaScript, or Driver. This enables the Driver to run independently from other Drivers being loaded in an asynchronous manner. Also, by setting the "display" variable in the JavaScript to reference the DOM element in the template portion just prior to the Driver (i.e., 'body'), all action by the JavaScript can be sandboxed (i.e. isolated) into that DOM element, in effect, and collisions are prevented. This also eliminates unnecessary polling for matching DOM elements by the JavaScript and greatly improves performance.

FIG. 12 illustrates the coding structure for the "ad" module called in line 20 of the code in FIG. 10. As described above, the tag [[ad_text]] is replaced by the value of data referencing the same name. Also, the [[Katy_id]] tag is populated with the internal ID of the module once again, so that the Driver in this module can run its code asynchronously without affecting or waiting on the Drivers of other modules. Again, all actions by the Driver code can be sandboxed by referencing the elements within the DOM node, as set in the "display" variable.

FIG. 13 illustrates the coding structure for an example of nesting modules. The nesting feature enables modules to be made from a collection of other, smaller modules. In this way, code may be broken into smaller and more manageable pieces to improve maintenance and development quality. An example is a photo "album" module, which comprises several "photo" modules. In the illustrated example, the data source contains an album object, and an array of photo objects. A single call is made to the Katy Library to create the album module using the katy_create( ) method. In line 21 of the code shown in FIG. 13, the katy_create( ) method is invoked, and a JavaScript object is passed in the second parameter comprising the data needed to build the album. There is an album title, and a collection of photos to be included in the album. Katy then retrieves the album template and replaces the title tag in the album module template with the album title in the data source. Then, the JavaScript module Driver within the template iterates through the photo elements, calling the katy_create( ) method for each one and creating a photo module. As the photo modules are created, they are appended to the template of the album module, and when complete, the entire block of HTML is returned to represent the full album of photos.

In this manner, the complex data object that was originally passed to the Katy Library to create the album is cascaded down as needed to build as many nested layers as necessary. The nesting levels are unlimited by the library and multiple level complex data objects can be cascaded down through any number of layers to build very complex, but modular website content.

FIG. 14 illustrates the coding structure for the example "album" module of FIG. 13. In this example, the [[Title]] tag is replaced with the album title value passed in the data source variable. The "Photos" array is then iterated and the value of each array element is passed to the katy_create( ) method, which returns a photo module and appends that module into the album module. Once the iteration is complete, the entire album module is returned to the original katy_create( ) method shown in FIG. 9.

FIG. 15 illustrates the coding structure for a procedure for calling the code to create a "photo" module. This module is very simple, and contains only an HTML template, as no user interaction is required. The [[File]] tag is replaced by the value passed in the data object sent to the katy_create( ) method in FIG. 14, and the HTML is returned to that function. If user interaction or DOM manipulation is needed in this module, a JavaScript Driver is appended after the containing <div> element as shown in the other module examples described above.

Looking in further detail at the client-side templating engine of the present disclosure, the following features become evident (with the engine given the nickname "Katy Library" all methods are prefixed with "katy_"):

The ability to pass complex data structures. Data streams are typically passed as JavaScript object instances or JavaScript array instances, but are usually limited to a single level and with all elements of the object having string values.

FIG. 16A illustrates objects representing a conventional simple data structure in a single level.

FIG. 16B illustrates objects representing a slightly more complex data structure having two levels.

FIG. 16C illustrates objects representing a complex data structure supported by the Driver system of the present disclosure. Such complex data structures can develop very quickly when building modular website components with nesting capabilities.

Supporting this type of complex data structures enables other robust features of the Katy Library, specifically nesting (as described above) and embedded logic and other client-side code. Embedded logic and other client-side code provide additional capabilities. For example, the template may include a mixture of HTML and JavaScript code, and the data source can be used to populate fields in any portion of that template. The JavaScript can then run complex logical calculations on the data and display different portions of the template, or display portions of the template differently, depending on the results of those calculations. Additionally, JavaScript code can be used similarly to manage the DOM elements of the HTML template in order to attach event listeners to those objects, or manipulate the objects based on user interaction or other events. Such code may be implemented in module Drivers, which often accompany the template code.

Figure 17:
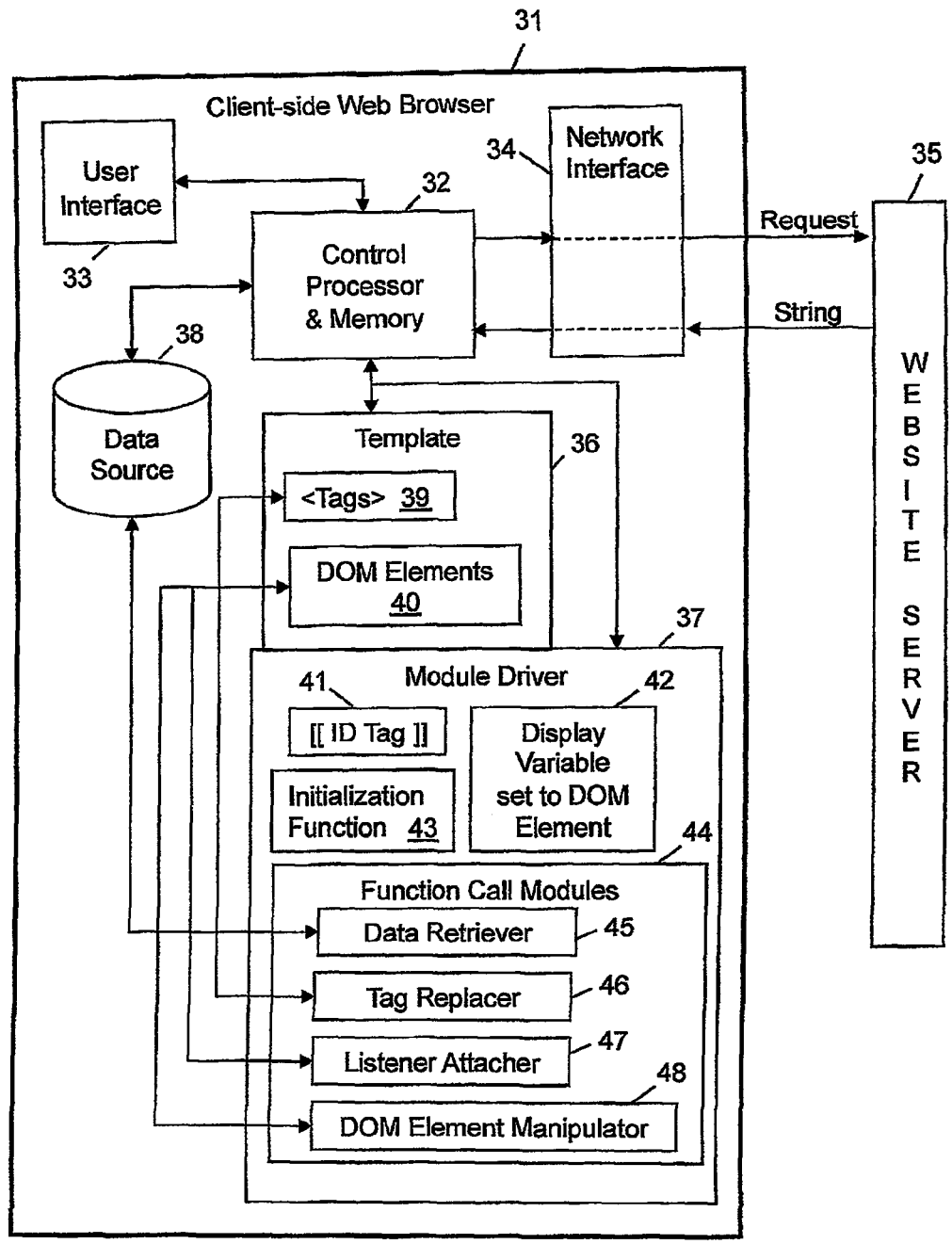
FIG. 17 is a simplified block diagram of the client-side web browser of the present disclosure.

FIG. 17 is a simplified block diagram of the client-side web browser 31 of the present disclosure. Operation of the browser may be controlled, for example, by a control processor 32 and associated memory for storing computer program instructions. A user interface 33 enables communication to and from the user, and a network interface 34 enables communication to and from a website server 35. The browser may request information for a website from the server by sending, for example, an HTTP request to the server. In response, the browser receives an information string containing resources such as a minimal amount of HTML, CSS, and JavaScript code, and compressed initial content data associated with DOM modules for the website home page encoded in a cacheable JSON file. For a given module, the information received from the server includes HTML code for a template 36 and JavaScript code for a module Driver 37. The content may be stored in cache or in a data source 38.

The template 36 may include various tags 39 such as the <div> tag with the ID of "content_div", which becomes a container for the content that will be generated. The template may also include various DOM elements 40 that provide the functionality of the module, once populated by the Driver 37. The Driver may include an ID tag 41, a Display variable 42, which is set to a DOM element 40 in the template, an initialization function 43 and call function modules 44. The call function modules may include a data retriever module 45, a tag replacer 46, a listener attacher 47, and a DOM element manipulator 48.

Once initialized, the Driver 37 receives instructions from the calling script and may retrieve data from a defined data source for the module, populate and render the template portion of the module, attach event listeners (triggers) to the DOM elements of the template, and manipulate the DOM elements of the template as needed in order to enable user interaction with the module.

FIG. 18 illustrates the coding structure for a method of loading separate DOM modules utilizing self-referencing of running script elements. The coding structure of FIG. 18 will run sequentially, like the example of FIG. 8, but it also allows the loading of modules dynamically or asynchronously in any order, even when another script is running asynchronously elsewhere on the page. In this example, when the script runs, the JavaScript code creates a reference to itself and places the reference into the variable "driver". Then, the display variable is set to a DOM element that can be found relative to the Driver, which allows the JavaScript to understand the context within which to manipulate the DOM. For example, the display variable may be set to a DOM element in the template immediately prior to module Driver. This sandboxes all actions by the module Driver into the referenced DOM element, thereby preventing collisions with scripts running asynchronously elsewhere on webpage and eliminating polling for matching DOM elements.

The coding structure of FIG. 18 also allows nested modules to be loaded to create parent-child relationships between modules, while maintaining the correct context for the running code within each individual module.

Figure 19:
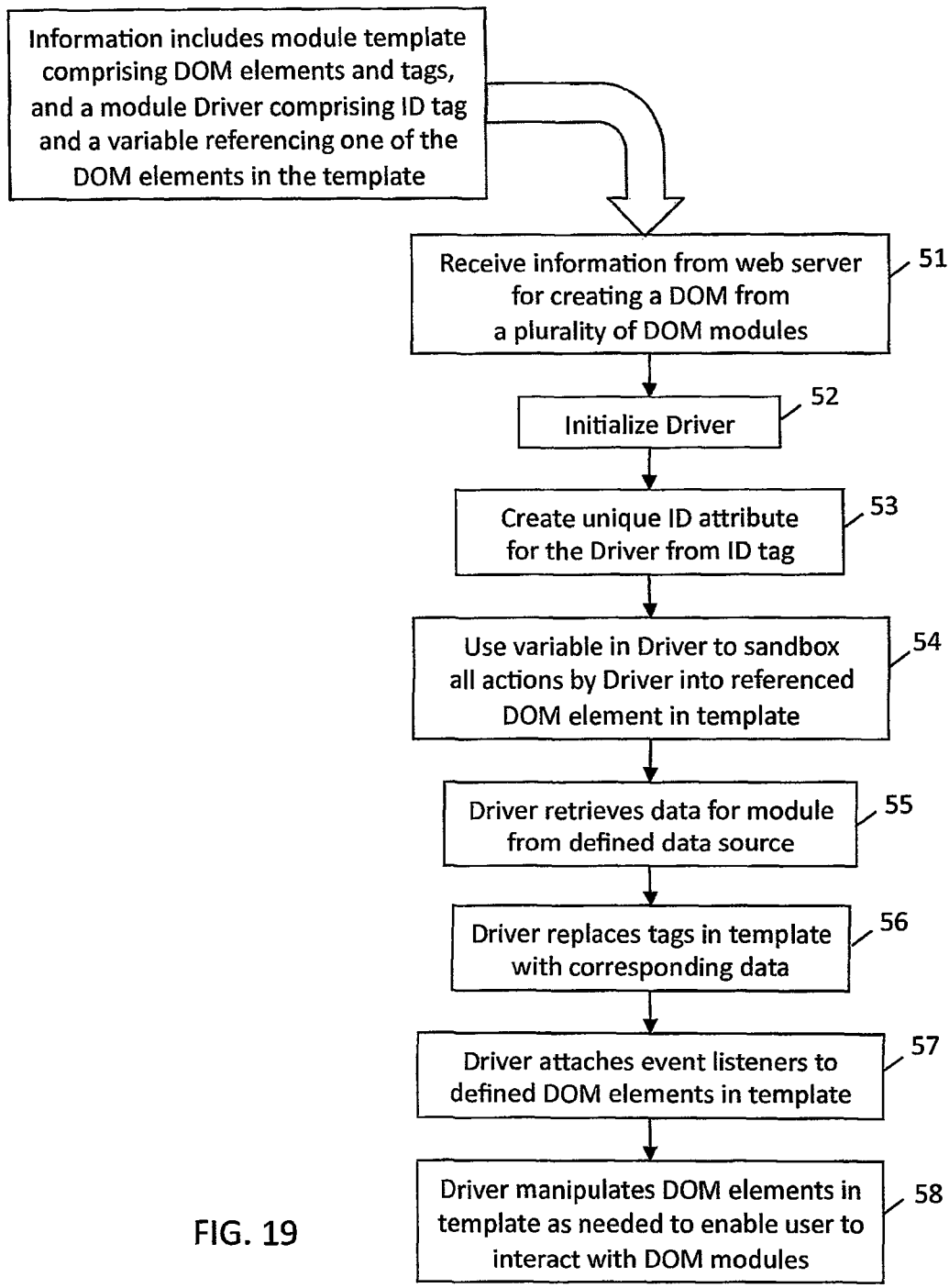
FIG. 19 is a flow chart illustrating a first exemplary embodiment of a method according to the present disclosure.

FIG. 19 is a flow chart illustrating an exemplary embodiment of a method according to the present disclosure. The method, performed in the client web browser, prevents collisions between DOM modules and eliminates polling for matching DOM elements while operating a website. The web browser is implemented in a computer and is in communication with a website server via a network connecting the computer and the web server. At step 51, the browser receives from the web server, information for creating a DOM from a plurality of DOM modules for displaying content to a user and interacting with the user. The received information includes a module template comprising DOM elements and tags to be replaced with data, and a module Driver comprising an identifier tag and a variable, which is set to reference one of the DOM elements in the template. At step 52, the Driver is initialized. At step 53, the browser creates from the Driver's identifier tag, a unique ID attribute for the Driver, thereby enabling the Driver to operate independent of other DOM modules. At step 54, the variable in the Driver is utilized to sandbox all actions by the Driver into the referenced DOM element in the template, thereby preventing collisions and eliminating polling for matching DOM elements. At step 55, the Driver retrieves data for the module from a defined data source. At step 56, the Driver replaces the tags in the template with corresponding data. At step 57, the Driver attaches event listeners to defined DOM elements in the template, and at step 58, the Driver manipulates DOM elements in the template as needed to enable user interaction with the DOM module.

Figure 20:
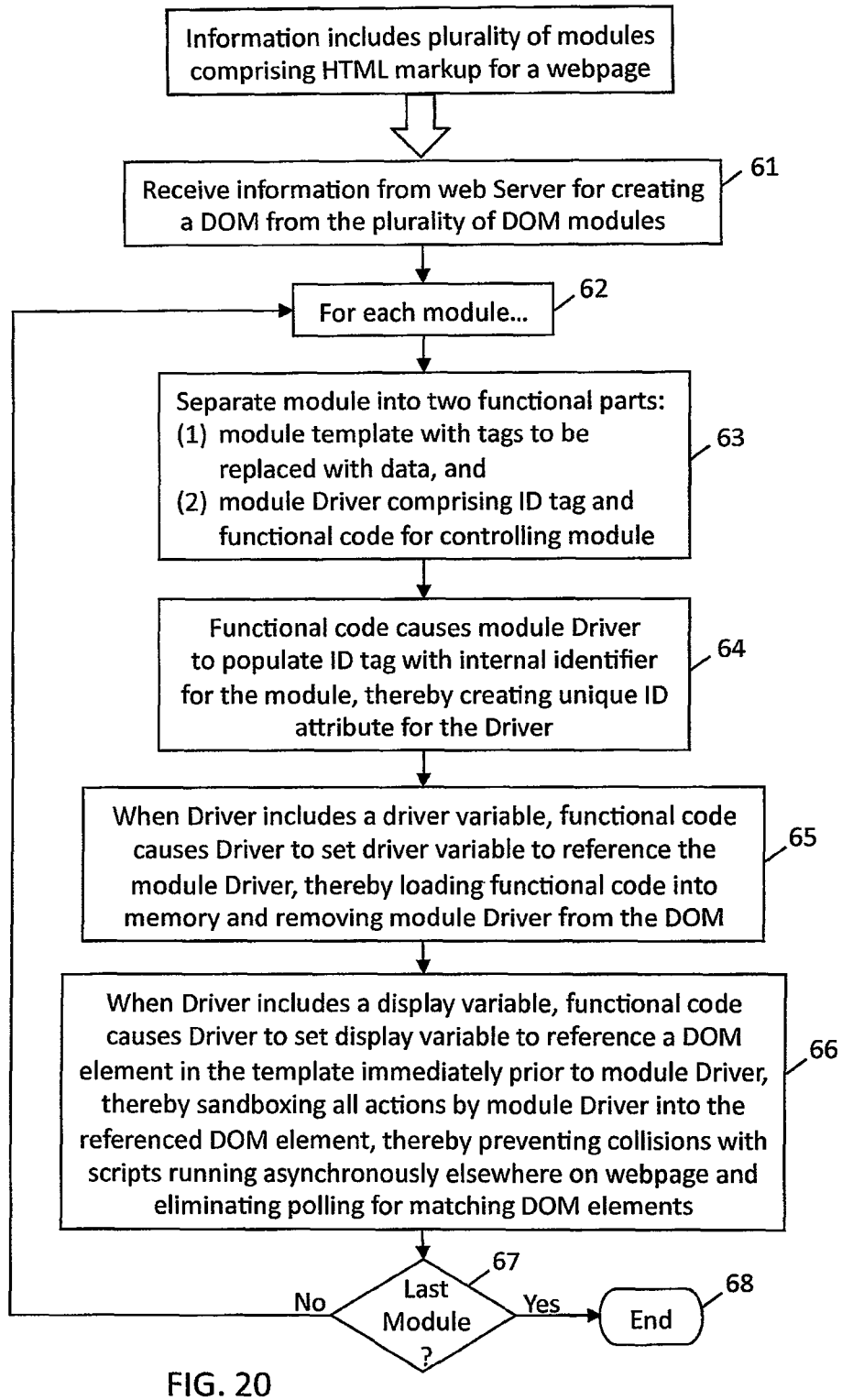
FIG. 20 is a flow chart illustrating a second exemplary embodiment of a method according to the present disclosure.

FIG. 20 is a flow chart illustrating a second exemplary embodiment of a method according to the present disclosure. This embodiment is directed toward a method of initializing and running the Driver code for each module asynchronously, rather than having one module waiting for another. This functionality improves the user experience and ensures the performance of each module does not affect the performance of other modules. Various embodiments include a method, a client web browser, and a DOM module Driver. FIG. 20 illustrates the method embodiment, which dynamically loads in any order, a plurality of modules comprising HTML markup for a webpage when one or more HTML scripts are running asynchronously elsewhere on the webpage. The browser embodiment may be performed by the browser as illustrated in FIG. 17.

At step 61, the web browser receives from the web server, information for creating a DOM from the plurality of modules. At step 62, the control processor 32 performs the following steps for each module: At step 63, the module is separated into two functional parts: (1) a module template comprising HTML markup that includes tags to be replaced with data; and (2) a module Driver comprising an identifier tag and functional code controlling the operation of the module Driver. At step 64, the functional code controlling the operation of the module Driver causes the module Driver to populate the identifier tag with an internal identifier for the module, thereby creating a unique ID attribute for the Driver. This enables the Driver to operate independent of other drivers that control other modules.

At step 65, when the module Driver includes a driver variable, the method may also include the step of setting the driver variable to reference the module Driver, thereby loading the functional code into memory and removing the module Driver from the DOM.

At step 66, when the module Driver includes a display variable, the method may also include the step of setting the display variable to reference in the module template, a DOM element immediately prior to the module Driver, thereby sandboxing all actions by the module Driver into the referenced DOM element in the template, preventing collisions with the scripts running asynchronously elsewhere on the webpage, and eliminating polling for matching DOM elements.

At step 67, the control processor 32 determines whether the last module has been processed. If not, the method returns to step 62 and repeats for each additional module until the last module has been processed. The method then ends at step 68.

Figure 21:
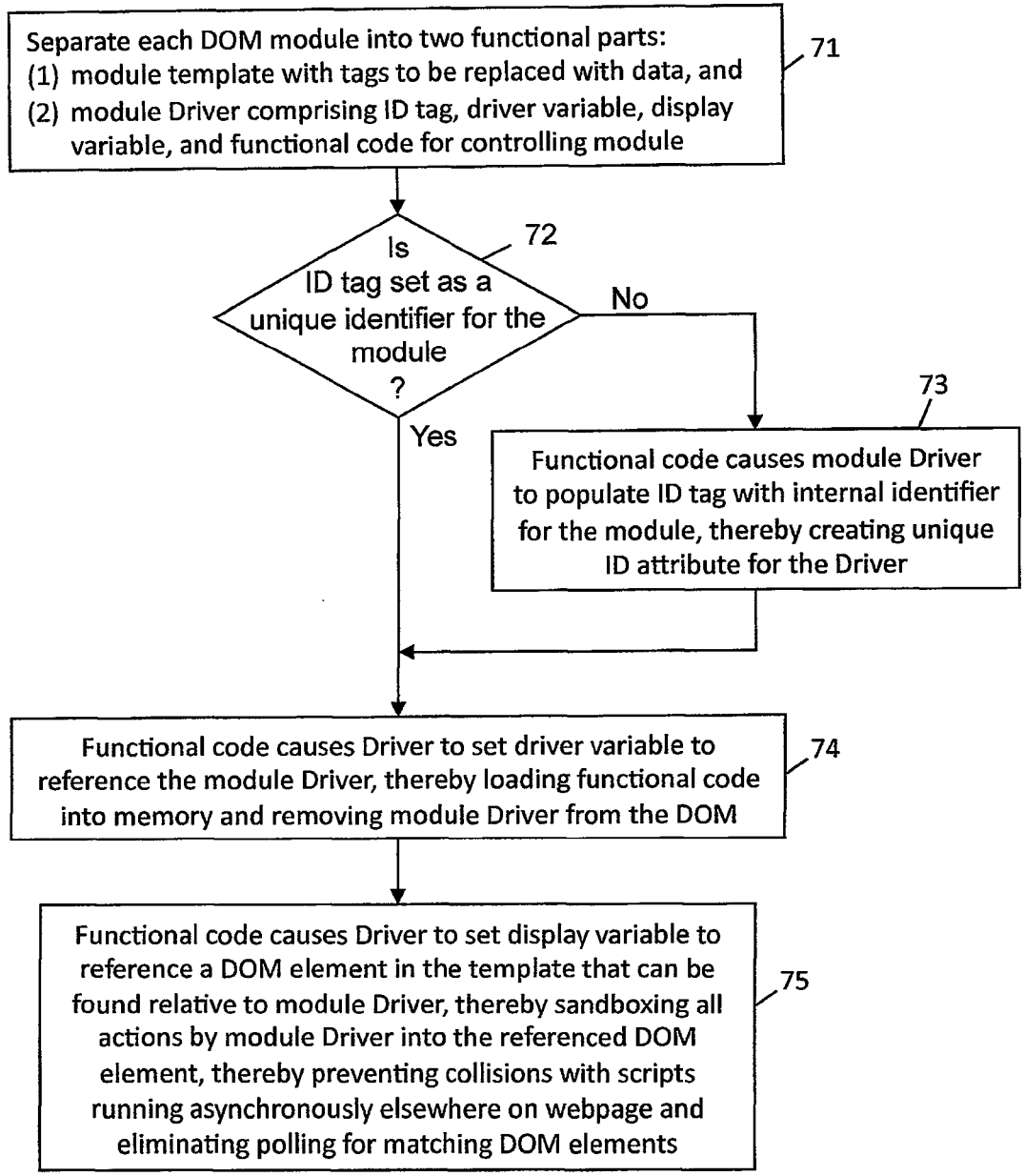
FIG. 21 is a flow chart illustrating a third exemplary embodiment of a method according to the present disclosure.

FIG. 21 is a flow chart illustrating a third exemplary embodiment of a method according to the present disclosure. The method will be described with reference to FIGS. 18 and 21. At step 71, each DOM module is separated into two functional parts: (1) a module template comprising HTML markup that includes tags to be replaced with data; and (2) a module Driver comprising an identifier tag, a driver variable, a display variable, and functional code controlling the operation of the module Driver. At step 72, it is determined whether the Driver ID tag is set as a unique identifier for the module. This value may be preset or it may be populated dynamically. If it is not preset, the method moves to step 73 where the functional code controlling the operation of the module Driver causes the module Driver to populate the identifier tag with an internal identifier for the module, thereby creating a unique ID attribute for the Driver. This enables the Driver to operate independent of other drivers that control other modules.

At step 74, the functional code causes the Driver to set the driver variable to reference the module Driver, thereby loading the functional code into memory and removing the module Driver from the DOM. At step 75, the functional code causes the Driver to set the display variable to reference in the module template, a DOM element that can be found relative to the module Driver, thereby sandboxing all actions by the module Driver into the referenced DOM element in the template. This DOM element is preferably the DOM element immediately prior to the module Driver, but it may be a different DOM element in the template as long as the element can be queried using CSS selector syntax relative to the Driver. In this case, there has to be a way to determine the specific DOM element since many of the modules will be repeated. A list of selectors may be found at the website for jQuery (api.jQuery.com) with the extensions "category/selectors/". However, since the code is loaded in a modular fashion and the Driver is included in the module with the display or template, the simplest solution is to query the DOM element immediately prior to the module Driver.

Setting the display variable in this manner prevents collisions with the scripts running asynchronously elsewhere on the webpage, and eliminates polling for matching DOM elements.

Another embodiment of the present disclosure is directed toward a computer-implemented method of constructing a nested website DOM module utilizing the client-side templating engine running within the JavaScript virtual machine built into the client web browser. A processor for the client web browser, such as control processor 32 (FIG. 17) within a client computer, executes code stored in a non-transitory memory to perform the method, which includes receiving by the client-side templating engine, a single call to create the nested DOM module. The client-side templating engine then retrieves data from the data source 38. The data from the data source may include data for populating the tags in the module template and data for creating a plurality of data blocks to be included in a nested data structure. The client-side templating engine populates the tags in the module template with the data for the tags, and the module Driver sequentially creates the plurality of data blocks using the data for creating the data blocks. Upon completion of each data block, the module Driver appends the completed data block to the module template to create the nested data structure. In response to the single call to create the nested DOM module, the client-side templating engine then returns the nested DOM module including the template with populated tags and the nested data structure.

The number of data blocks appended by the DOM module Driver is not limited by the client-side templating engine. Additionally, it should be noted that additional levels of complexity can be achieved when at least one of the data blocks appended by the DOM module Driver includes multiple smaller data blocks.

Figure 22:
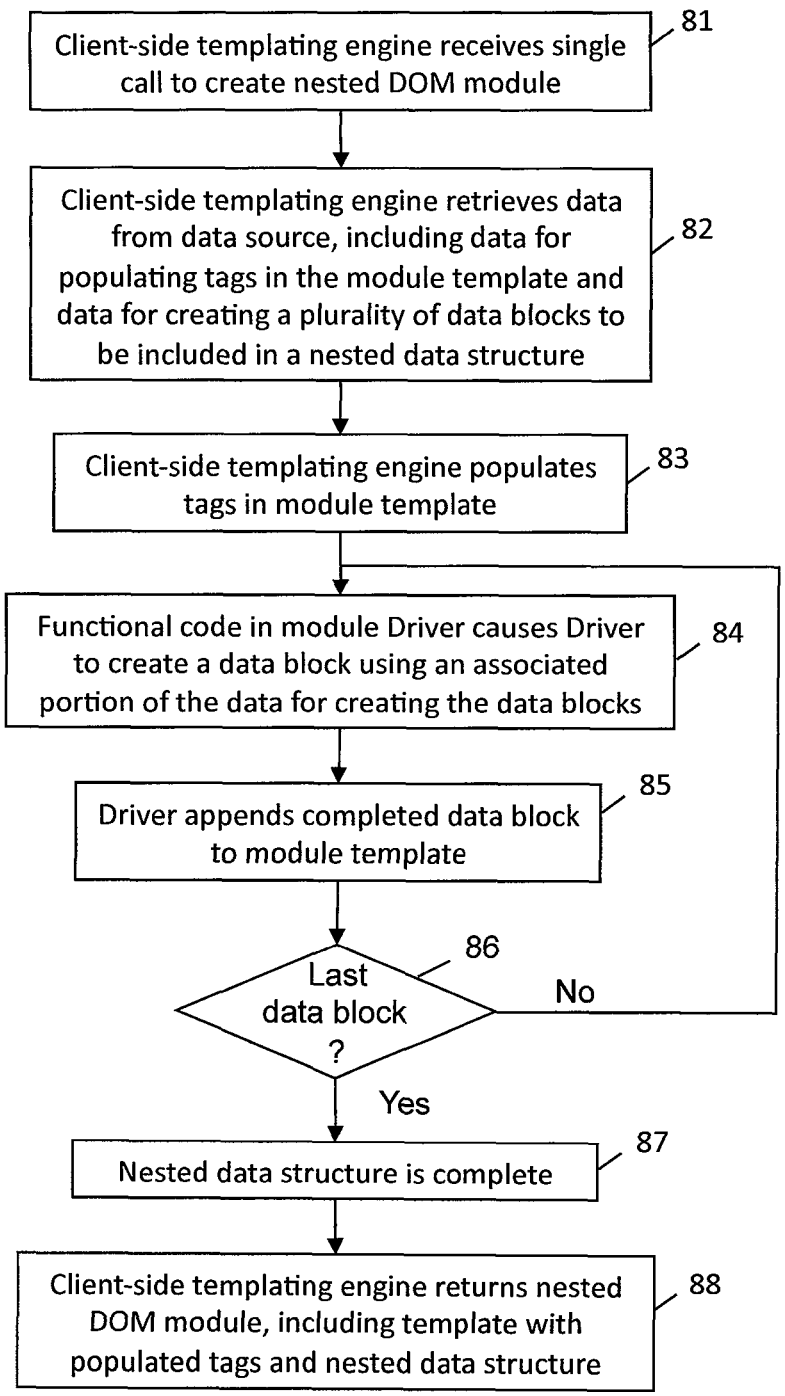
FIG. 22 is a flow chart illustrating a fourth exemplary embodiment of a method according to the present disclosure.

FIG. 22 is a flow chart illustrating a fourth exemplary embodiment of a method according to the present disclosure. This embodiment utilizes the client-side templating engine to construct a nested website DOM module. At step 81, the client-side templating engine receives from the web browser, a single call to create the nested DOM module. At step 82, the client-side templating engine retrieves data from the data source 38 (FIG. 17). The data from the data source may include data for populating the tags in the module template and data for creating a plurality of data blocks to be included in a nested data structure. At step 83, the client-side templating engine populates the tags in the module template with the data for the tags. At step 84, functional code in the module Driver causes the Driver to create a data block using an associated portion of the data for creating the data blocks. Upon completion of the data block, the module Driver appends the completed data block to the module template at step 85. At step 86, it is determined whether the completed data block is the last data block to be created from the retrieved data. If not, the method returns to steps 84 and 85 where the module Driver creates and appends another data block. When it is determined at step 86 that all of the data blocks have been created and appended to the module template, the method moves to step 87 and concludes that the nested data structure is complete. At step 88, the client-side templating engine then returns the nested DOM module, including the template with populated tags and the nested data structure, to the web browser.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-implemented method of constructing a nested Document Object Model (DOM) module for a website utilizing a client-side templating engine, wherein a processor within a computer executes code stored in a non-transitory memory to perform the steps of:

receiving by the client-side templating engine, a single call to create the nested DOM module, wherein the client-side templating engine creates the nested DOM module to include a module template and a module Driver, wherein the module template includes DOM elements and tags to be replaced with data, and the module Driver includes an identifier (ID) tag, a driver variable, a display variable, and functional code controlling operation of the module Driver;

retrieving by the client-side templating engine, data from a data source, wherein the data from the data source includes data for populating the tags in the module template and data for creating a plurality of data blocks to be included in a nested data structure for the DOM module;

executing the functional code controlling operation of the module Driver to ensure the ID tag is set as a unique identifier for the DOM module, thereby creating a unique ID attribute for the module Driver, which enables the module Driver to operate independent of other drivers that control other DOM modules in the DOM;

executing the functional code controlling operation of the module Driver to set the driver variable to reference the module Driver, thereby loading the functional code into memory and removing the module Driver from the DOM;

executing the functional code controlling operation of the module Driver to set the display variable to reference in the module template, a DOM element that can be found relative to the module Driver, thereby sandboxing all actions by the module Driver into the referenced DOM element in the template, preventing collisions with the other DOM modules running asynchronously elsewhere on the webpage, and eliminating polling for matching DOM elements;

executing the functional code controlling operation of the module Driver to populate the tags in the module template with the data for the tags;

executing the functional code controlling operation of the module Driver to sequentially create the plurality of data blocks using the data for creating the data blocks;

upon completion of each data block, executing the functional code controlling operation of the module Driver to append the completed data block to the module template to create the nested data structure; and in response to the single call to create the nested DOM module, the client-side templating engine returning the nested DOM module, including the template with populated tags and the nested data structure.

2. The method as recited in claim 1, wherein the number of appended data blocks is not limited by the client-side templating engine.

3. The method as recited in claim 1, wherein at least one of the appended data blocks includes multiple smaller data blocks.

4. A client web browser configured to construct a nested Document Object Model (DOM) module for a website utilizing a client-side templating engine, wherein the client web browser is implemented in a computer having a processor and a non-transitory memory that stores computer program instructions, wherein when the processor executes the computer program instructions, the browser is caused to:

make a single call to the client-side templating engine to create the nested DOM module, wherein the client-side templating engine creates the nested DOM module to include a module template and a module Driver, wherein the module template includes DOM elements and tags to be replaced with data, and the module Driver includes an identifier (ID) tag, a driver variable, a display variable, and functional code controlling operation of the module Driver;

retrieve by the client-side templating engine, data from a data source, wherein the data from the data source includes data for populating the tags in the module template and data for creating a plurality of data blocks to be included in a nested data structure for the DOM module;

execute the functional code controlling operation of the module Driver to ensure the ID tag is set as a unique identifier for the DOM module, thereby creating a unique ID attribute for the module Driver, which enables the module Driver to operate independent of other drivers that control other DOM modules in the DOM;

execute the functional code controlling operation of the module Driver to set the driver variable to reference the module Driver, thereby loading the functional code into memory and removing the module Driver from the DOM;

execute the functional code controlling operation of the module Driver to set the display variable to reference in the module template, a DOM element that can be found relative to the module Driver, thereby sandboxing all actions by the module Driver into the referenced DOM element in the template, preventing collisions with the other DOM modules running asynchronously elsewhere on the webpage, and eliminating polling for matching DOM elements;

execute the functional code controlling operation of the module Driver to populate the tags in the module template with the data for the tags;

execute the functional code controlling operation of the module Driver to sequentially create the plurality of data blocks using the data for creating the data blocks;

upon completion of each data block, executing the functional code controlling operation of the module Driver to append the completed data block to the module template to create the nested data structure; and in response to the single call to create the nested DOM module, return by the client-side templating engine, the nested DOM module including the template with populated tags and the nested data structure.

5. The client web browser as recited in claim 4, wherein the number of appended data blocks is not limited by the client-side templating engine.

6. The client web browser as recited in claim 4, wherein at least one of the appended data blocks includes multiple smaller data blocks.

7. A Document Object Model (DOM) module Driver in a client-side templating engine executed by a processor controlling a client-side web browser, wherein the DOM module Driver is configured to create a nested data structure for a DOM module, wherein the DOM module includes the DOM module Driver and a module template, wherein the module template includes DOM elements and tags to be replaced with data, and the module Driver includes an identifier (ID) tag, a driver variable, a display variable, and functional code controlling operation of the module Driver, wherein when the web browser makes a single call to the client-side templating engine to create the DOM module, the DOM module Driver is caused to:

execute the functional code controlling operation of the module Driver to ensure the ID tag is set as a unique identifier for the DOM module, thereby creating a unique ID attribute for the module Driver, which enables the module Driver to operate independent of other drivers that control other DOM modules in the DOM;

execute the functional code controlling operation of the module Driver to set the driver variable to reference the module Driver, thereby loading the functional code into memory and removing the module Driver from the DOM;

execute the functional code controlling operation of the module Driver to set the display variable to reference in the module template, a DOM element that can be found relative to the module Driver, thereby sandboxinq all actions by the module Driver into the referenced DOM element in the template, preventing collisions with the other DOM modules running asynchronously elsewhere on the webpaqe, and eliminating polling for matching DOM elements;

execute the functional code controlling operation of the module Driver to sequentially create a plurality of data blocks using data objects obtained from a data source; and upon completion of each data block, execute the functional code controlling operation of the module Driver to append the completed data block to the module template to construct the nested data structure;

wherein, in response to the single call to create the nested DOM module, the client-side templating engine returns to the web browser, the DOM module including the nested data structure.

8. The DOM module Driver as recited in claim 7, wherein the number of data blocks appended by the DOM module Driver is not limited by the client-side templating engine.

9. The DOM module Driver as recited in claim 7, wherein at least one of the data blocks appended by the DOM module Driver includes multiple smaller data blocks.

* * * * *